Feb. 9, 1926.  1,572,519
F. W. DAVIS
VIBRATION ABSORBING MEANS FOR STEERING GEARS FOR MOTOR VEHICLES
Filed Sept. 24, 1923   2 Sheets-Sheet 1
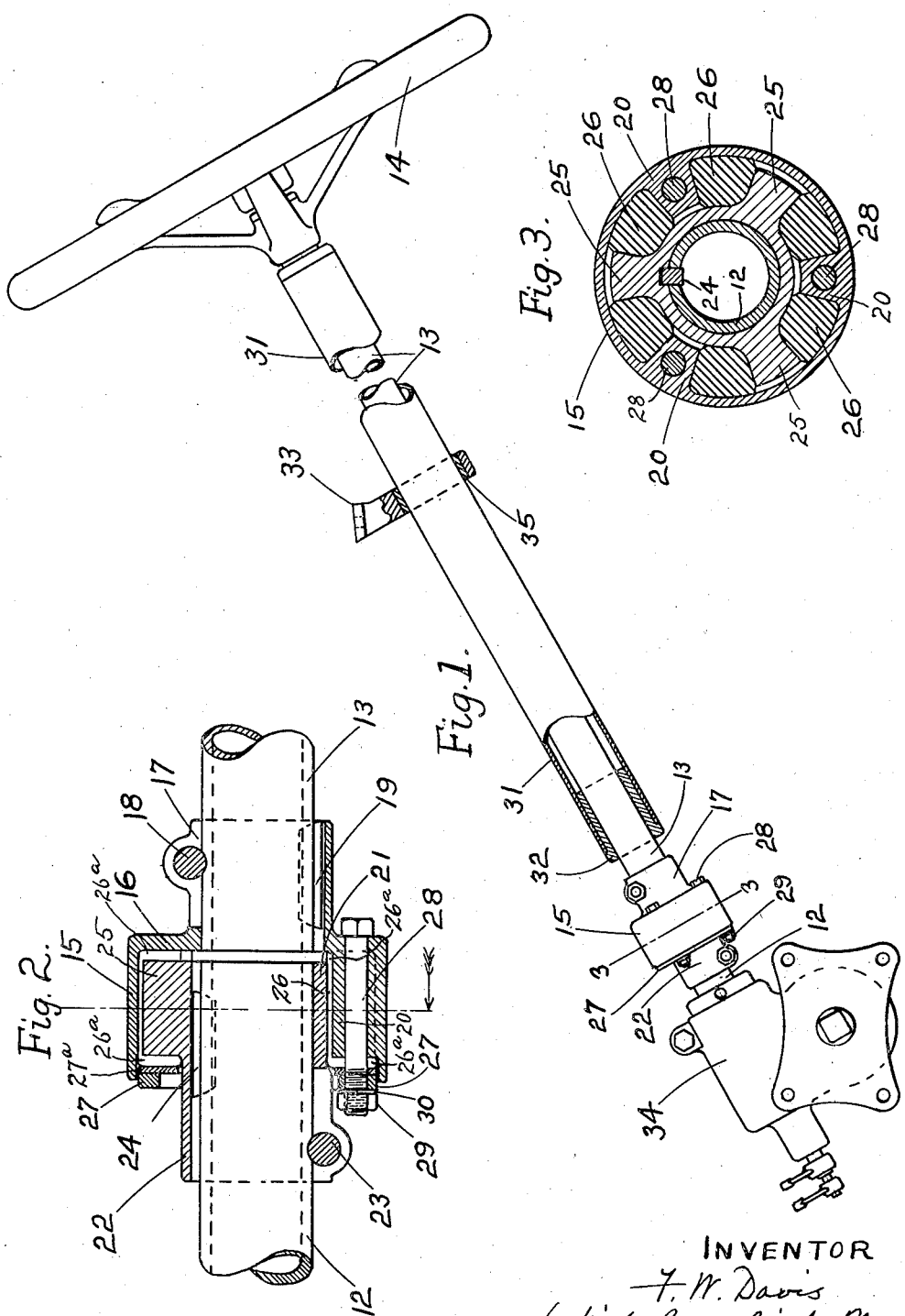
INVENTOR
F. W. Davis

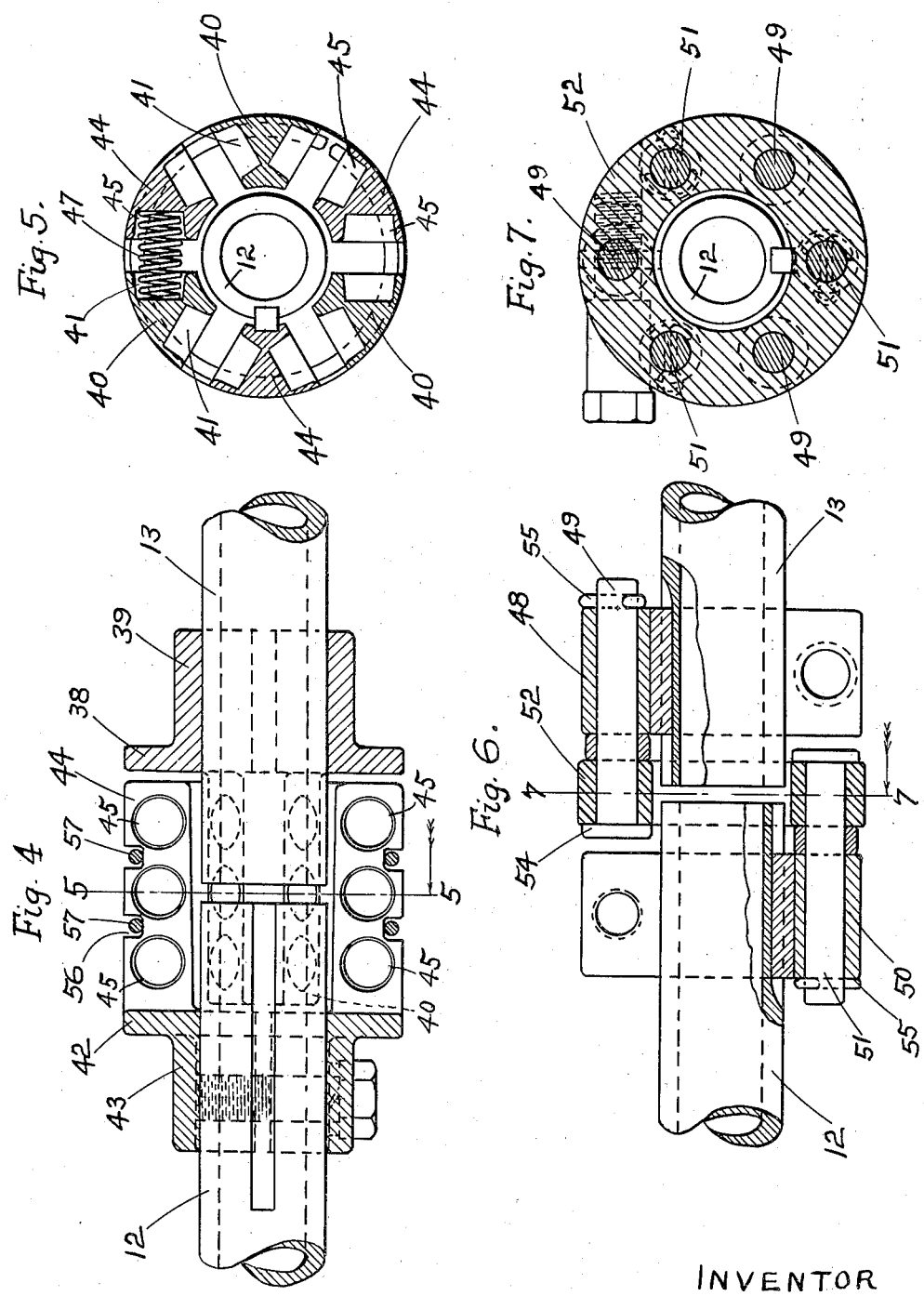

Patented Feb. 9, 1926.

1,572,519

UNITED STATES PATENT OFFICE.

FRANCIS WRIGHT DAVIS, OF WALTHAM, MASSACHUSETTS.

VIBRATION-ABSORBING MEANS FOR STEERING GEARS FOR MOTOR VEHICLES.

Application filed September 24, 1923. Serial No. 664,647.

*To all whom it may concern:*

Be it known that I, FRANCIS W. DAVIS, a citizen of the United States, residing at Waltham, in the county of Middlesex and State of Massachusetts, have invented new and useful Improvements in Vibration-Absorbing Means for Steering Gears for Motor Vehicles, of which the following is a specification.

In a typical steering gear there is a reduction of movement between the steering wheel and road wheels; thus permitting the road wheels to be turned with a limited muscular effort on the steering wheel. In the same way road shocks to the front wheels of a great intensity, but of small amplitude, are transmitted through the steering gear to the driver's hands where they evidence themselves as sharp reactions of diminished intensity, due to the leverage and the friction in the gear.

It is customary practice to fasten the steering gear either to the engine crank-case or to the chassis frame. This gives the necessary rigidity of mounting to withstand the various reactions in the steering gear. It also gives a very undesirable effect on the driver's hands from the engine vibration transmitted up the steering column to the steering wheel.

Any one driving a motor car for an extended run is acutely aware of the fatigue suffered in the hands and wrists. Numbness in fingers and hands is the result of holding on to the wheel in the business of steering; thus absorbing the road shock and engine vibration. The same effect is present in short runs, but to a smaller degree. Anything tending to decrease or eliminate this undesirable condition offers attractive possibilities, providing it is simple in construction, easy to install, and absolutely safe.

The primary object of my invention is to provide simple, safe and easily installed means for absorbing road shocks and engine vibration from the steering gear of a motor vehicle, and preventing any objectionable transmission of such shocks and vibration to the steering wheel.

Another object is to provide as an element of a steering gear which includes a steering wheel shaft transversely divided into a lower section subjected to the usual vibrations of the vehicle, and an upper section carrying the steering wheel, a vibration-absorbing coupling adapted to be detachably secured to, and operably connect said sections, and including means for transmitting rotary motion from the upper to the lower section, and for absorbing vibrations imparted to the lower section.

I attain the above-mentioned and other related ends as hereinafter described.

Of the accompanying drawings forming a part of this specification,—

Figure 1 is a side elevation of that portion of a motor vehicle steering gear which includes the steering wheel, the figure showing portions of the sectional steering wheel shaft, and the preferred vibration-absorbing coupling connecting the shaft sections.

Figure 2 shows the coupling in longitudinal section, and portions of the shaft sections in elevation.

Figure 3 is a section on line 3—3 of Figure 1.

Figure 4 is a view similar to a portion of Figure 1, showing another type of vibration-absorbing coupling.

Figure 5 is a section on line 5—5 of Figure 4.

Figures 6 and 7 illustrate another type of coupling, Figure 6 being a view similar to Figure 2, and Figure 7 a section on line 7—7 of Figure 6.

The same reference characters indicate the same parts in all of the figures.

A steering gear embodying the invention comprises a steering wheel shaft made in two independent sections 12 and 13. The lower section 12 is rotatively supported by the engine crank case or the chassis frame, and extends continuously from its upper end to a screw, cam, or other reducing device, as is the case when the steering wheel shaft extends continuously from the reducing mechanism to the steering wheel. The lower section is therefore subjected to the usual vibrations due to road shocks and the vibrations of the engine.

The upper section 13 is fixed to the steering wheel 14, and is connected with the lower section 12 by a vibration-absorbing coupling which includes means for transmitting rotary motion from the upper to the lower section, and for absorbing the vibrations imparted to the lower section, so that no objectionable vibrations are imparted to the upper section and the hand wheel.

The construction of said coupling may be variously modified, the drawings showing three forms, each embodying the invention in its broader aspects.

The preferred form is shown by Figures 1, 2 and 3, which I will next describe.

15 designates an annular casing closed at one end and open at the other. The closed end 16 forms a transverse or end abutment for the springs hereinafter described. From the closed end 16 projects a split sleeve 17, adapted to be closed as by a clamping bolt 18, upon the upper section 13, and positively secured to said section by a key 19, inserted in slots in the said sleeve and section. The casing 15 thus rigidly attached to the upper section, projects from the lower end of said section and surrounds and is spaced from the upper end of the lower section 12. The casing is provided with inwardly projecting spaced apart ears 20 (Figure 3) extending parallel with its axis and constituting longitudinal abutments for the above mentioned springs.

21 designates a sleeve formed to embrace the upper end of the lower section 12, within the casing 15. Said sleeve is provided with a split extension 22, adapted to be closed as by a clamping bolt 23, upon the lower section. The sleeve is also positively secured to the section 12 by a key 24 (Figure 2) inserted in slots in the sleeve and in the section 12.

The sleeve is provided with outwardly projecting spaced apart ears or longitudinal spring abutments 25, extending parallel with the abutments 20 and spaced therefrom. Said sleeve and its abutments 25 constitute a spider.

Between the abutments 20 and 25 are interposed oblong rubber springs 26, filling the space between the abutments and composed of a rubber composition compounded to give suitable resiliency and long life.

The springs are adapted to yieldingly transmit rotary motion from the upper section 13 to the lower section 12, without permitting an objectionable back lash of the upper section and the steering wheel, and to absorb the vibrations imparted to the lower section and prevent objectionable transmission of said vibrations to the upper section and the steering wheel. To retain the springs 26 in their operative positions, I provide clamping means adapted to exert compressive endwise pressure on the outer ends of the springs and press their inner ends against the closed end 16 of the casing, said means being preferably embodied in a clamping ring 27 (Figure 2) bearing on the exposed outer ends of the springs, and headed bolts 28, extending through the casing abutments 20 and the clamping ring, and having clamping nuts 29, bearing on the clamping ring, or on lock washers 30, interposed between the nuts and the clamping ring. By varying the tension on the bolts 28, the ring may be adjusted to longitudinally compress and laterally expand the springs and thereby vary their vibration-absorbing property. Segmental bearing plates 27ª may be interposed between the ring 27 and the springs 26.

The above-described construction provides a flexible connection between the upper section 13, carrying the steering wheel, and the lower section 12 which is in direct metallic contact with the engine or chassis frame.

To prevent the possibility of direct metallic contact of the spider formed by the sleeve 21 and abutments 25 with the transverse abutment 16 and with the clamping ring 27, I elongate the springs 26, so that normally they are of considerably greater length than the abutments 25, the end portions 26ª of said springs projecting in opposite directions from the opposite ends of said abutments as shown by Figure 2 and constituting buffer portions adapted to prevent direct contact of the abutments 25 with the transverse abutment 16 and the clamping ring 27. Said buffer portions therefore absorb vibrations tending to move either of the sections 12 and 13 endwise.

The fixed outer tube 31, constituting the external member of the steering column instead of extending from the steering wheel to the lower end of the steering shaft, as heretofore, is shortened so that its lower end is immediately above the coupling, as shown by Figure 1. Said lower end is provided with a bushing 32 in which the shaft section 13 is rotatable. The outer tube 31 may be supported by any suitable means such as a bracket 33, fixed to the vehicle dash. The lower section 12 may be journaled in a fixed bearing or housing 34, immediately below the coupling.

The shaft sections are tubular and the usual horn wire, spark shaft, throttle shaft and segment shaft extend through the shaft sections and through the coupling.

To further eliminate engine and chassis vibration from the steering wheel, the outer tube 31 may be insulated by a vibration-absorbing sleeve or packing 35, of material such as felt or rubber, interposed between the tube and its support. In most cases, however, this will not be necessary, as the amount of vibration imparted from the dash to the steering wheel through the outer tube and its support, is negligible.

The prime element of safety will be apparent from the foregoing, it being obvious that the springs 26 and the adjustable clamping ring 27 may be removed without interfering with the steering operation, beyond a slight increase in back lash as evidence of the removal.

Figures 4 and 5 show another type of vibration-absorbing coupling, which comprises an annular head 38, having a split collar 39, clamped upon and positively secured to the upper section 13, and provided with spring abutments formed as spaced apart arms 40, extending parallel with the axis and having spring-receiving recesses 41 in their opposite sides. This coupling also comprises an annular head 42, having a split collar 43, clamped upon and positively secured to the lower section 12, and provided with spring abutments formed as spaced apart arms 44, extending parallel with the arms 40, and alternating therewith, the arms 44 having spring-receiving recesses 45 in their opposite sides. Helical springs 47 are interposed between the arms 40 and 44 and seated in the recesses of said arms, as shown by Figure 5. The outer sides of the abutments 44 and 45 may be provided with grooves 56, with which are engaged annular binders 57 of piano wire.

A third type of vibration-absorbing coupling is shown by Figures 6 and 7. This coupling comprises a split annular head 48, clamped upon and positively secured to the upper section 13, and provided with abutments formed as spaced apart studs 49, projecting from the head and arranged parallel with the axis. The coupling also comprises a split annular head 50, clamped upon and positively secured to the lower section 12, and provided with abutments formed as spaced apart studs 51, extending parallel with the studs 49 and alternating therewith.

The motion-transmission and vibration-absorbing means is embodied in a rubber annulus 52, surrounding the adjacent ends of the shaft sections and perforated to receive the abutments 49 and 51.

The portions of the annulus 52 between the studs are adapted to transmit rotary motion from one shaft section to the other, and to absorb the vibrations to which the inner shaft section 12 is subjected. The rubber of the annulus 52 should be compounded like that of the springs 26 in the first described embodiment. The studs 49 and 51 are inserted in orifices formed for their reception in the heads 48 and 50, and each stud is provided at one end with a head 54, and at its opposite end with a cotter-pin 55.

An existing steering gear including the usual one-piece steering shaft and the usual fixed outer tube substantially coextensive in length with the steering shaft, may be converted into a steering gear having vibration-absorbing means, by transversely dividing the shaft into the two sections shown, attaching the rigid members of the vibration-absorbing coupling to said sections and modifying the fixed outer tube of the steering column, as above described. The said coupling, adapted for attachment to the two sections of a steering shaft, may therefore be supplied as an article of manufacture.

The clamping ring 27 and the bearing plates 27ª are of smaller diameter than the casing 15, so that they may enter the latter indeterminately, and constitute, with the bolts 28 and nuts 29, a suitable embodiment of means for varying the vibration-absorbing property of the resilient means provided by the rubber springs 26 by varying the position of the clamping ring. When the clamping ring is pressed inward toward the closed end 16, the springs are longitudinally compressed and laterally expanded, so that they decrease the vibration-absorbing property of the springs. When pressure on the clamping ring is relaxed, the springs are permitted to longitudinally expand and laterally contract so that their vibration-absorbing property is increased. The vibration-absorbing property may, therefore, be proportioned to the amplitude of the vibrations.

The resilient means of the coupling absorbs vibrations as above described, and is adapted to permit deviations of the upper section of the shaft and of the outer tube 31 from true axial alinement with the lower section 12, so that the outer tube may be easily conformed to the position of the bore of the bracket 33, in case said bore is out of alinement with the lower section 12. In other words, the said resilient means compensates for any misalinement of the bracket bore with the axis of the lower shaft section.

As implied in the foregoing description and in the following claims, I am not limited to the specific mechanism of the preferred embodiment of the invention shown by Figures 1, 2 and 3 of the drawings, except as otherwise required in certain of the more limited claims.

I claim:

1. A steering gear for motor vehicles, comprising a two-part steering wheel shaft composed of a lower section subjected to the usual road and engine vibrations of the vehicle, and an upper section carrying a steering wheel; and a vibration-absorbing coupling connecting said sections, and including means for transmitting rotary motion from the upper to the lower section, and for absorbing vibrations imparted to the lower section.

2. A steering gear for motor vehicles, comprising a two-part steering wheel shaft composed of a lower section subjected to the usual road and engine vibrations of the vehicle, and an upper section carrying a steering wheel; and a vibration-absorbing coupling connecting said sections, including rigid members fixed to the adjacent ends of the sections and provided with oppositely projecting spaced apart abutments, the abutments of one section alternating with those of the other, resilient means interposed between the said abutments and adapted to transmit rotary motion from one section to the other, and to absorb vibrations imparted to the lower section, and means for varying the vibration-absorbing property of said resilient means.

3. A steering gear for motor vehicles, comprising a two-part steering wheel shaft composed of a lower section subjected to the usual road and engine vibrations of the vehicle, and an upper section carrying a steering wheel; and a vibration absorbing coupling connecting said sections, and including a rigid annular casing fixed to one section and provided with spaced apart inwardly projecting rigid abutments, a rigid sleeve fixed to the other section within said casing, and provided with spaced apart outwardly projecting rigid abutments alternating with and spaced from the casing abutments, springs interposed between the said abutments and adapted to transmit rotary motion from one section to the other, and to absorb vibrations imparted to the lower section, and means for varying the vibration-absorbing property of said springs.

4. A steering gear for motor vehicles, comprising a two-part steering wheel shaft composed of a lower section subjected to the usual road and engine vibrations of the vehicle, and an upper section carrying a steering wheel; a vibration-absorbing coupling connecting said sections, said coupling including a rigid outer casing member fixed to one section and provided with a series of inwardly projecting longitudinal abutments and a closed end forming a transverse abutment, at one end of said series, the opposite end of the outer member being open, a rigid inner member fixed to the other section and provided with a series of outwardly projecting longitudinal abutments alternating with and spaced from the inwardly projecting abutments, the faces of said longitudinal abutments being substantially radial to the shaft axis, and the face of the transverse abutment substantially at right angles with said axis, rubber springs interposed between the longitudinal abutments, an annular clamping ring of smaller diameter than the open end of the outer member and exerting endwise clamping pressure on the springs, and means adjustably confining said clamping ring so that the ring may be adjusted to variably compress the springs longitudinally and variably expand the same laterally, and thereby vary the vibration-absorbing property of the springs, buffer portions being provided to prevent direct contact of the outwardly projecting abutments with the transverse abutment and the clamping ring.

5. A steering gear for motor vehicles, comprising a two-part steering wheel shaft composed of a lower section and an upper section carrying a steering wheel, a fixed housing having means for connection with a portion of the vehicle, and supporting the lower section, said housing and lower section being subjected to the usual road and engine vibrations of the vehicle, a fixed outer tube supporting the upper section and having means for connection with another portion of the vehicle, and a vibration-absorbing coupling connecting said sections and including means for transmitting rotary motion from the upper to the lower section, and for absorbing vibrations imparted to the lower section.

6. In combination, a two-part steering-wheel shaft composed of a lower section and an upper section carrying a steering wheel, a fixed housing having means for connection with a portion of the vehicle and supporting the lower section, said housing and lower section being supported by and subjected to the usual road and engine vibrations of the vehicle, a fixed outer tube surrounding the upper section, a vibration-absorbing coupling connecting said sections and including resilient means for transmitting rotary motion from the upper to the lower section, said means being adapted to absorb vibrations imparted to the lower section, and to permit deviations of the upper section and the outer tube from true axial alinement with the lower section, and a bracket fixed to another portion of the vehicle and having a bore embracing the outer tube, the said resilient means compensating for any misalinement of the said bore with the axis of the lower section.

In testimony whereof I have affixed my signature.

FRANCIS WRIGHT DAVIS.